Nov. 10, 1936.   W. C. KRUEGER   2,060,735
METHOD AND MEANS FOR APPLYING NUTRIENT SOLUTION TO PLANTS
Filed July 16, 1935   2 Sheets-Sheet 1

INVENTOR
Walter C. Krueger
BY
A. D. T. Libby
ATTORNEY

Nov. 10, 1936.   W. C. KRUEGER   2,060,735
METHOD AND MEANS FOR APPLYING NUTRIENT SOLUTION TO PLANTS
Filed July 16, 1935   2 Sheets-Sheet 2
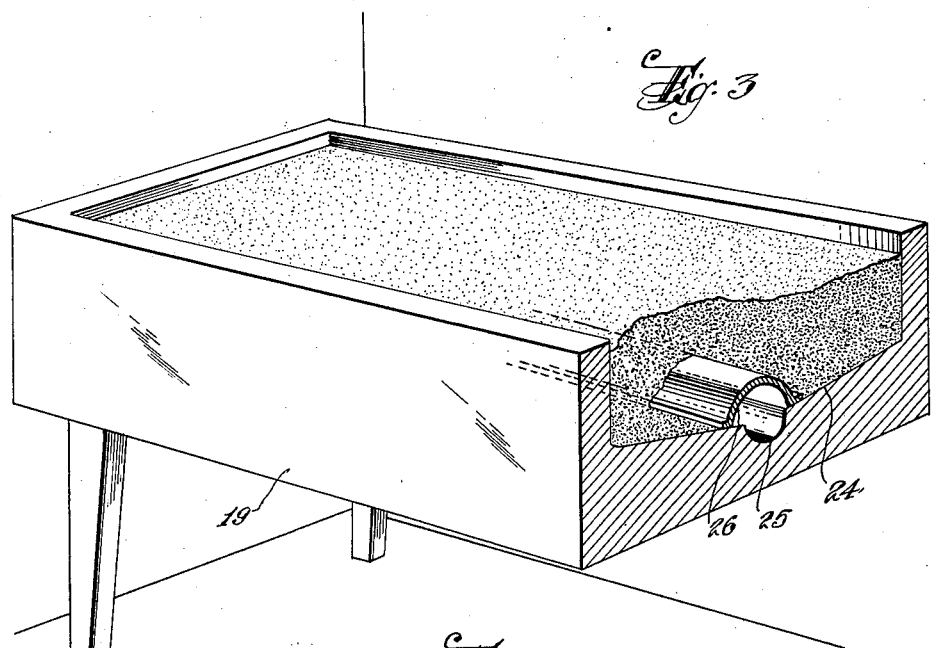
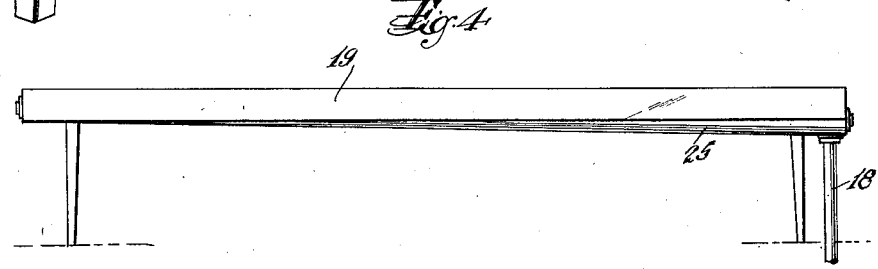
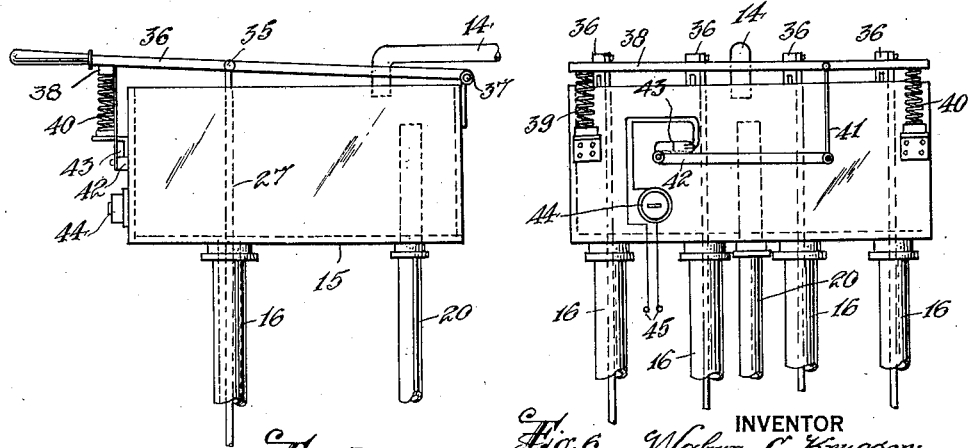
INVENTOR
Waban C. Krueger:
BY
A. D. T. Libby
ATTORNEY Patented Nov. 10, 1936

2,060,735

UNITED STATES PATENT OFFICE 2,060,735

METHOD AND MEANS FOR APPLYING NUTRIENT SOLUTION TO PLANTS

Wabun C. Krueger, Dayton, N. J., assignor to Endowment Foundation, New Brunswick, N. J., a corporation of New Jersey Application July 16, 1935, Serial No. 31,714

12 Claims. (Cl. 47—38)

This invention relates to a method and means for applying nutrient solutions to plants.

It is common practice, particularly in greenhouses, to make up compost soils in various ways, but since these soils are full of weed seeds and insects or other animal organisms, they must be sterilized. This is now done by heating with live steam, by chemicals or by an electric sterilizing process such as is disclosed in Patent 2,036,416 to the present applicant.

When plants are grown in inert materials such as sand, ashes or the like, and fed with nutrient solutions, these are applied by sprinkling or wetting with a hose, or by means of sprinkling cans. All of this requires considerable labor which involves the human element as to the quantity applied, and endangers the plants or foliage thereof either by mechanical injury or burning or spotting by reason of the nutrient solution contacting with the plant parts.

It is therefore the principal object of my invention, as defined in the present process, to avoid all of this work by providing plant beds made up of sterile sand, ashes or inert soil which are relatively inexpensive and substantially free from weed seeds, insects and/or animal organisms, and to apply to these beds, in a new and novel manner, a nutrient solution.

Another object of my invention is to provide a method and means for applying the nutrient solution to the plant bed in such a way that it never contacts with the plant stems and foliage, and which at the same time provides positive and automatic aeration of the entire bed.

Another object of my invention is to provide a method and means for applying different nutrient solutions to different plant beds in a new and expeditious manner.

These and other objects will be apparent to one skilled in this art, after reading the specification taken in connection with the annexed drawings wherein:

Figure 3 is a sectional view across the central portion of one of the plant beds.

Figure 4 is a side view of one of the plant beds.

Figure 5 is a side elevational view of one of the level feed tanks.

Figure 6 is a view of the left end of Figure 5.

Figure 1:
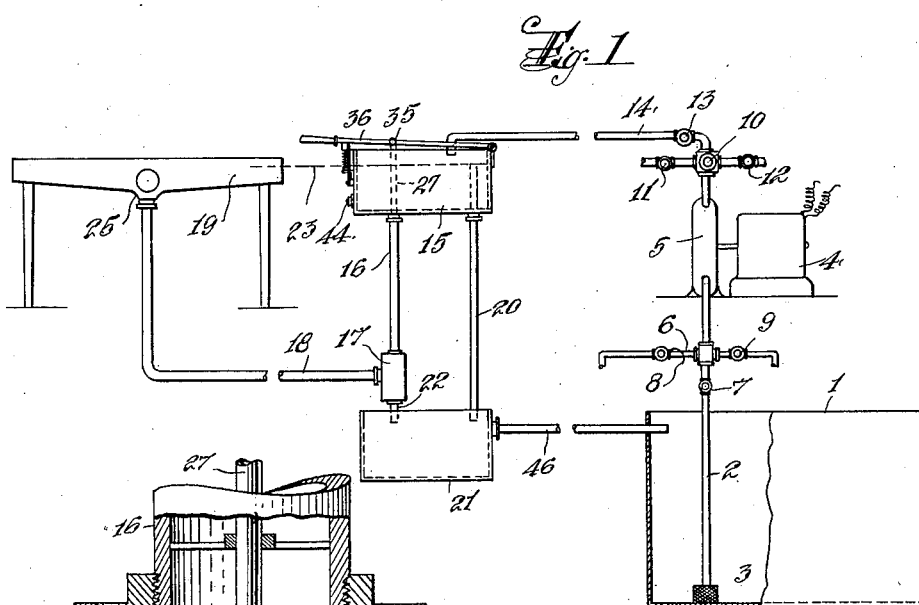
Figure 1 is a schematic view showing the manner of putting my invention to practice.
Figure 2:
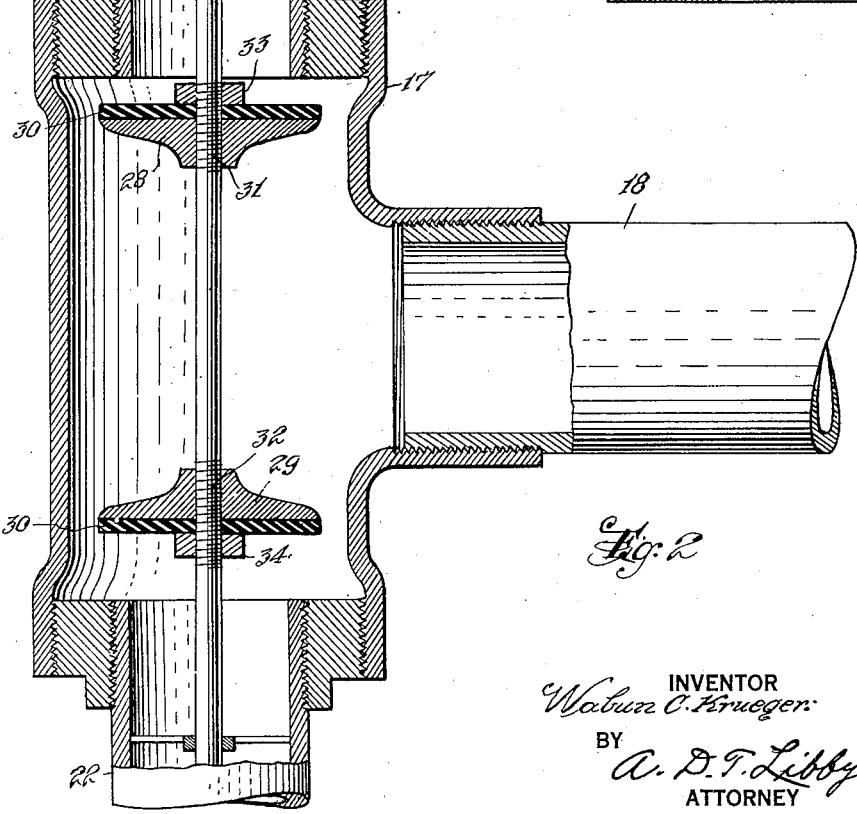
Figure 2 is a view on an enlarged scale of one of the mechanical parts used in the system.

In the various views, wherein like numbers refer to corresponding parts, 1 is a supply tank or sump from which a suction pipe 2 extends, the same being provided with a strainer 3 at the bottom of the sump. To draw the nutrient solution from the sump, I prefer to use an electric motor 4 connected to a pump 5. On one side of the pump, a header 6 is arranged with various supply valves 7, 8 and 9, which is utilized to connect sumps having different nutrient material therein to the pump 5. The outlet side of the pump 5 is provided with a similar header 10 having control valves 11, 12 and 13 associated therewith, whereby the nutrient fluid coming from the pump may be directed to the various pipes 14 leading to their respective receiving or level chambers or tanks 15.

The tank 15 is connected through the medium of a pipe 16 and control valve 17, and feed and drain pipe 18, with a box or container 19 generally referred to as a plant bed. The tank 15 is provided with an overflow pipe 20 extending to a settling basin or tank 21 which is also connected through the control valve 17 by a pipe 22. The tank 15 and its overflow pipe 20 is arranged with respect to the plant bed so that the top of the overflow pipe is below the top of the bed 19 as indicated by the broken line 23, from which it will be seen that the plant bed 19 can never be overfilled or flooded beyond a certain height or level.

The plant bed 19 is preferably provided with its bottom sloping toward the center, as indicated by the line 24; and likewise, the center is provided with a trough-like formation or channel 25 which slopes from one end of the bed 19 to the other, where the feed and drain pipe 18 is connected. The channel 25 is covered with half-tile 26 to keep the sand, ashes or other inert material, which is used in the bed, from passing, in any quantity, into the channel and out the feed and drain pipe 18.

The control valve 17 has associated therewith a control rod 27 carrying valve plates 28 and 29, the faces of which carry a resilient material 30, such as soft rubber. As will be seen, the control rod 27 is threaded at 31 and 32, whereby the valve plates 28 and 29 may be adjusted thereon and locked in position by nuts 33 and 34. The control rod 27 for each valve extends upwardly through the tank 15 and is connected at 35 with an operating lever 36 pivoted at 37 at one side of the tank 15.

It is to be understood that there are as many control rods 36 as there are plant beds to be treated, Figure 6 showing four such levers. Associated with these levers, is a cross-link 38 which is actuated on movement of any one of the levers 36. When one of the levers 36 is pushed downwardly, for instance, against the compression springs 39 and 40, this link actuates through a connecting rod 41, a switch lever 42 that in turn closes contacts in the mercury switch device 43, which may be connected to a manually operative switch 44 through a source of current supply indicated by the terminals 45.

Assuming that the switch 44 is in closed position, when the contacts and the switch 43 are in circuit-closed position as above described, the motor 4 is started and the pump will draw the nutrient material from the sump 1, to which it may be connected, and will deliver this nutrient solution to the proper tank 15, from which it is fed through the pipes 16 and 18 to the plant bed 19, as has been described. When the plant bed 19 has been filled to the level of the line 23, the control lever 36 is released and the springs 39 and 40 restore the lever 36 to normal position. The raising of the control lever 36, as just described, closes the valve 28 and opens the valve 29, which allows the nutrient solution in the bed to run back out of the pipe 18 into the settling basin 21 and from it, by means of the pipe 46, to the sump 1.

During this operation, the material in the plant bed will absorb the necessary amount of nutrient solution, which will serve the bed until the next operation, all of which may be done manually or automatically.

As indicated in Figure 6, the level or supply tank 15 may have a plurality of pipes 16 with associated valves 17 and pipes 18 connected therewith, in accordance with the number of plant beds that are to be treated with a particular type of nutrient solution. Other plants which are desired to be treated with a different type of solution, are connected up through their respective tanks 15, which are supplied from the headers 6 and 10, and the motor and pump, as has been described.

In the above process, it will be seen that since the nutrient solution is forced into the bed from the bottom, none of the solution comes in contact with the stem or foliage of the plant; furthermore, the air is forced out of the bed from below, thereby giving positive and automatic aeration of the entire bed. When the solution is drained out of the bed, the air comes in from the top, the whole arrangement being such that the beds are quickly filled with the nutrient solution and likewise drained in an expeditious manner, and the process requires a minimum amount of labor with the positive certainty of uniform feeding of the nutrient solution to the plant beds.

While I have illustrated a more or less manual control on the motor, I may use a time control mechanism whereby the beds may be given a bath of nutrient solution at time-spaced intervals, so that the drawings indicate merely the underlying principles involved in carrying out the objects of my invention.

What I claim is:

1. Means for applying a nutrient solution to plants including, a sump containing the solution to be used, a pump connected into the sump, means for operating the pump, a leveling tank connected to the pump, a plant bed containing the plants, a drain and settling basin, a control valve with means for actuating the same, pipes between the leveling tank, the control valve, the plant bed, and the drain and settling basin, and a pipe from the drain and settling basin to the sump, and an overflow pipe for the leveling tank, the top of the overflow pipe being below the top of the plant bed.

2. Means for applying a nutrient solution to plants as set forth in claim 1, further characterized in that the pipe to the plant bed enters the same from the bottom so the solution is forced up through the material in the bed and all around the roots, at the same time aerating the bed.

3. Means for applying a nutrient solution to plants as set forth in claim 1, further characterized in that the pipe to the plant bed enters the same from the bottom and at one end of the bed, the bed having a covered channel tapering from one end to the pipe end for expediting the drainage of the bed.

4. Means for applying a nutrient solution to plants as set forth in claim 1, further characterized in that the control valves act in one direction of operation to shut the passage to the drain and settling basin and open the pipe passage from the leveling tank to the bed, and in the other direction of operation to reverse the control of pipe openings.

5. Means for applying a nutrient solution to plants as set forth in claim 1, further characterized in that the leveling tank has a lever for operating said control valve, said lever having a cross-link connected with a switch lever, said switch lever on one direction of movement actuating a switch to start the motor and pump, and on the reverse direction to open said switch to stop the motor and pump.

6. Means for applying a nutrient solution to plants as set forth in claim 1, further characterized in that the overflow pipe from the leveling tank empties into the drain and settling basin.

7. Means for applying a nutrient solution to plants as set forth in claim 1, further characterized in that the plant bed contains, as seats for the plants, inert and cheap materials such as sand or ashes.

8. Means for applying a nutrient solution to plants as set forth in claim 1, further characterized in that means are provided for selecting a sump tank carrying a desired nutrient solution, and further means for selecting a desired leveling chamber for supplying the selected solution to plant beds connected thereto and requiring said solution.

9. In combination with a bed in which plants are set, means for applying nutrient solution from a source of supply to said bed which includes piping for forcing the solution upwardly through the bed, to get aeration thereof, to a predetermined level with means separate from the bed for holding this level for a time, and means for then automatically draining off the solution from the bed.

10. The method of applying nutrient solution to plants that are set in beds, which consists in forced aeration of the bed by feeding a chosen nutrient solution from the under part of the bed and then automatically draining off the solution.

11. The method of applying nutrient solution to plants that are set in a bed of inert material continuously open to air and light, which consists in so constructing said bed as to adapt it to be forcibly aerated and flooded from its bottom to a predetermined level and afterwards completely drained, preparing said solution by mixing fertilizer with water, maintaining a supply of said solution at a level below such bed's flood level, passing said solution from the supply, catching and boxing the solution and while the boxing is in progress, passing a portion of the boxed solution to said bed until both portions attain said flood level and are connected by a strait of solution, said one portion forcing air through said bed while thus passing, continuing to pump an excess of said solution, then simultaneously with the attaining of the flood level and the start of the excess, beginning to pass said excess and drain said bed, then continuing so to pass and drain while retaining all of said other portion boxed, then collecting together such passed excess and such drainings, then separating solid from liquid in such collection, then passing such separated liquid back to said supply to commingle therewith and repeat such cycle.

12. The method of growing plants, which consists in making a bed with the plants in a cheap inert material such as sand and ashes, then flooding the bed from a point below the plant stems and foliage for a time to a desired height with a desired nutrient solution, and then automatically draining off the solution.

WABUN C. KRUEGER.